Patented Nov. 14, 1944 2,362,760

UNITED STATES PATENT OFFICE 2,362,760

INSECTICIDAL COMPOSITIONS

Kenneth E. Maxwell, Martinez, Calif., assignor to Shell Development Company, San Francisco, Calif., a corporation of Delaware No Drawing. Application January 12, 1943, Serial No. 472,141

13 Claims. (Cl. 167—42)

This invention, a continuation-in-part of my copending application, Serial No. 445,106, filed May 28, 1942, which is a continuation-in-part of application Serial No. 409,195, filed September 2, 1941, relates to new and improved insecticidal compositions and more particularly to a new and improved agent for depositing solid insecticidal materials from an aqueous carrier.

A primary object of this invention is to provide an additive for insecticidal and fungicidal compositions capable of yielding increased deposits of said material when sprayed on foliage, fruits, or growing trees. Thus lead arsenate, basic copper sulfate, cryolite, Bordeaux mixture, etc., which have long been used as insecticides, are usually applied in the form of a suspension in water. For foliage spraying they are usually mixed with water in amounts of the order of from 1 to 10 lbs. per 100 gallons of water. The water acts as a carrying agent for the insecticide and effects a distribution of the insecticide over the plant. However, the water also carries considerable quantities of the insecticide from the sprayed object. It is toward minimizing the carry-off of the insecticide and increasing the deposition thereof from an aqueous carrier that the instant invention is directed. It will be obvious that with increased deposition of the insecticide savings thereof will be effected and a lower concentration of insecticide in water will be required to obtain a lethal dosage.

A further object is to provide a depositing agent which will cause the insecticide to adhere firmly to the fruit or foliage.

The term "insecticide" or "solid insecticide" as used herein will refer to such substances as Bordeaux mixture, copper sulfate, cryolite, lead arsenate, red copper oxide, sulfur, either with or without the addition of the additives known to be used therewith, such as toxicants, spreaders, etc. Such toxicants may comprise pyrethrum, rotenone, derris resins, nicotine, aliphatic thiocyanates, dinitro cresols, dinitro phenols, ketones, ketols, halogenated hydrocarbons such as chlorinated napthalenes, cresylic acid, alkyl amines, pine oils, rosinols, etc.

I have discovered that when suitable salts of carboxylic acids with certain amides of polyamines with fatty acids are added to an aqueous carrying medium containing a solid insecticide in suspension and this mixture sprayed on fruit and foliage a smooth and uniform deposit of unusual magnitude of the insecticide is obtained. The invention will be more thoroughly understood from the following description:

The effect of my depositing agents for solid insecticides in aqueous suspensions may be explained on the basis of electrokinetic phenomena. Aqueous suspensions of solvent insecticides, as well as wet-leaf surfaces, normally possess negative electrostatic charges. Thus when sprayed on leaves such materials tend to be repelled by the leaf surfaces. The magnitude of the negative charge is directly related to the ability of the insecticide to attach itself to the leaf and consequently the conventional aqueous suspension of a solvent insecticide does not readily deposit on the material sprayed. In keeping therewith, I believe the effectiveness of my depositing agents to be due to a reduction in the negative charge or the establishment of a straight positive charge on the suspended particles and consequently a lowering of the repelling tendency or an increase in the attraction of the object sprayed for the insecticide.

The compounds suitable for my purpose are the salts of low molecular weight carboxylic acids, preferably polycarboxylic acids and especially hydroxy substituted dicarboxylic acids, with the higher fatty acid mono-amides of alkylene polyamines.

The low molecular weight acids which may be used to form salts are preferably aliphatic polycarboxylic acids having less than 7 carbon atoms, and especially those acids in which the ratio of carbon atoms to carboxyl groups is less than 5. Such acids as oxalic, malonic, succinic, maleic, fumaric, glutaric, glutaconic, adipic, allylmalonic acids and the like may be used. Especially effective are the hydroxy substituted polycarboxylic acids, such as tartronic, malic, dihydroxysuccinic, trihydroxyglutaric and citric acids.

The amides are preferably obtained by reaction of alkylene polyamines with higher molecular weight hydrocarbon carboxylic acids which may contain substitution radicals, such as Cl, OH, etc. These higher acids preferably contain at least 10 carbon atoms, and in general not more than 30 carbon atoms. These higher acids may be aliphatic, naphthenic, or aromatic carboxylic acids, which have a terminal hydrocarbon chain of at least 8 carbon atoms, which terminal chain is unsubstituted with polar radicals. For example, suitable acids include undecylenic acid, lauric acid, myristic acid, palmitic acid, stearic acid, oleic acid, ricinoleic acid, melissic acid, ricinostearolic acid, ricinoleyl lactic acid, chloracetylstearic acid, chlorinated oleic acid, linoleic acid, linolenic acid, stearyl cyclohexanoic acid, lauryl cyclopentanoic acid, decyl benzoic acid, cetyl toluic acid, cetyl phenylethanoic acid, margaryl naphthoic acid, mixtures of any two or more of the above-mentioned acids or other acids, mixed higher fatty acids derived from animal or vegetable sources, for example, cocoanut oil, rapeseed oil, sesame oil, palm kernel oil, palm oil, olive oil, soyabean oil, peanut oil, castor oil, seal oils, sardine oil, and other fish oils, teaseed oil, partially or completely hydrogenated animal or vegetable oils, such as those mentioned; hydroxy and alpha-hydroxy carboxylic aliphatic acids such as dihydroxystearic acid, dihydroxy palmitic acid, dihydroxybehenic acid, and the like.

Suitable alkylene polyamines which may be reacted with the above-mentioned higher acids to form the intermediate amides of the present invention include alkylene diamines, in which the amine groups may be both on primary and/or secondary carbon atoms and are joined together preferably with short hydrocarbon chains. Especially effective are polyamines in which at least one of the amino groups is primary. For example, suitable polyamines include the diamines, such as ethylene diamine, monomethyl ethylene diamine, 1-1 dimethyl ethylene diamine, propylene diamine, butylene diamine, and especially alkyl N-alkylene diamines, such as methyl N-ethylene diamine, ethyl N-ethylene diamine, isopropyl N-butylene diamine, and preferably hydroxy alkyl N-alkylene diamines, such as hydroxyethyl ethylene diamine, hydroxy propyl propylene diamine, as well as other polyamines, for example, monoethyl diethylene triamine, tetra (hydroxyethyl) tetraethylene pentamine, di (hydroxyethyl) diethylenetriamine, etc.

The preferred depositing agents of the present invention are prepared by initially reacting an alkanol alkylene diamine, for example, ethanol N-ethylene diamine, with a higher aliphatic carboxylic acid, for example, a mixture of palmitic and stearic acids, under conditions such as assure a substantial yield of the mono-amide. The resulting acylated alkanol N-alkylene diamine is then reacted with a lower polybasic carboxylic acid, preferably a hydroxylated acid, such as malic acid.

In general, effective quantities of my additives range from about .01 to 5 oz. per 100 gallons of aqueous suspension of the insecticide chosen. As has been aforementioned, the solid insecticides are usually suspended with water in the proportions of about 1 to 10 lbs. of insecticide per 100 gallons of water.

Example

The effectiveness of the depositing agents was determined under conditions simulating field practice. Insecticides to be treated, both with and without the herein described depositing agents, were emulsified in water in a small field-type spray machine capable of operating at spraying pressures up to 1000 lbs. Numerical evaluation of the spray deposits for the various insecticides and additives tested was obtained by spraying weighed four-ounce oil sample bottles, the sides of which had been coated with a thin layer of beeswax. The bottles were weighed to the nearest $\frac{1}{10}$ milligram on an analytical balance before spraying and again after spraying, and allowing sufficient time to elapse so that all water from the spray had evaporated. The drying was expedited by placing the bottles in a stream of dust-free air. The area of the sides of the sample bottles averaged close to 150 sq. cm., and since they were sprayed in sets of three for each test, the following equation can be derived:

$$D=\frac{W\times 1000}{150\times 3}=2.22W$$

where D is the average deposit in micrograms per square centimeter and W is the total spray residue on the three bottles in milligrams.

The depositing agents tested as shown in the table below were tested under the following conditions:

| | |
|---|---|
| Pressure in the spray machine ____ lbs./sq. in. | 500 |
| Circulation time in seconds of the insecticidal composition in the spray machine | 30 |
| Spray nozzle orifice diameter ____ inches | $\frac{5}{64}$ |
| Exposure of sample bottles to spray ____ seconds | 6 |
| Distance spray nozzle to the sample bottle ____ feet | 6 |

Table

| Sample No. | Solid insecticide | Lbs. of solid insec./100 gals. | Depositing agent | Oz. of dep. agt./100 gals. | Dep. on beeswax (gms./cm.²) | Deposit factor (test matl./std.) |
|---|---|---|---|---|---|---|
| 1 | Lead arsenate (brand A) | 3 | None | | 20 | 1.00 |
| 2 | do | 3 | The malate of— $C_{15\&17}H_{31\&35}\overset{O}{\overset{\parallel}{C}}-(NHC_2H_4)_2-OH$ | 0.25 | 36 | 1.80 |
| 3 | do | 3 | do | 1.0 | 51 | 2.50 |
| 4 | do | 3 | do | 2.0 | 40 | 2.00 |
| 5 | Lead arsenate (brand B) | 3 | None | | 22 | 1.00 |
| 6 | do | 3 | (Same as in sample 2) | 0.1 | 40 | 1.80 |
| 7 | do | 3 | do | 0.25 | 47 | 2.10 |
| 8 | do | 3 | do | 1.0 | 40 | 1.80 |
| 9 | Lead arsenate (brand C) | 3 | None | | 16 | 1.00 |
| 10 | do | 3 | (Same as in Sample 2) | 0.25 | 58 | 3.60 |
| 11 | do | 3 | do | 0.50 | 40 | 2.50 |
| 12 | Cryolite | 3 | None | | 27 | 1.00 |
| 13 | do | 3 | (Same as in Sample 2) | 0.25 | 38 | 1.40 |
| 14 | Basic copper sulphate | 6 | None | | 49 | 1.00 |
| 15 | do | 6 | (Same as in Sample 2) | 0.10 | 62 | 1.20 |
| 16 | do | 6 | do | 0.25 | 71 | 1.40 |
| 17 | do | 6 | do | 0.50 | 60 | 1.20 |

The above-described specific carboxylic acid salt of hydroxy diamine is merely illustrative of compounds useful for my purpose. It will be understood that compounds meeting the tests described herein as to operativeness, for my purpose and equivalents are included within the scope of the invention.

While I have advanced certain theories of operation for my newly invented depositing agents for insecticidal materials, it will be understood that I do not limit myself to any such theory of operation set out, but only to the invention as set out in the appended claims.

I claim as my invention:

1. An aqueous insecticidal composition comprising dispersed in water a solid insecticidal toxicant and a small amount for the salt of a polycarboxylic acid of less than 7 carbon atoms with a mono-amide formed by reaction between a higher molecular weight hydrocarbon carboxylic acid and a hydroxy alkyl N-alkylene diamine.

2. An aqueous insecticidal composition comprising dispersed in water a solid insecticidal toxicant and a small amount of the salt of a polycarboxylic acid of less than 7 carbon atoms with a mono-amide formed by reaction of a carboxylic acid of a hydrocarbon having a terminal hydrocarbon chain of at least 8 carbon atoms and an alkylene polyamine.

3. An aqueous insecticidal composition comprising dispersed in water a solid insecticidal toxicant and a small amount of the salt of a polycarboxylic acid of less than 7 carbon atoms with a mono-amide formed by reaction of a carboxylic acid of a higher molecular weight hydrocarbon and an alkylene polyamine.

4. An aqueous insecticidal composition comprising dispersed in water a solid insecticidal toxicant and a small amount of the salt of a hydroxy polycarboxylic acid of less than 7 carbon atoms with a mono-amide formed by reaction of a carboxylic acid of a higher molecular weight hydrocarbon and an alkylene polyamine.

5. An aqueous insecticidal composition comprising dispersed in water a solid insecticidal toxicant and a small amount of the salt of a polycarboxylic acid of less than 7 carbon atoms with a monoamide formed by reaction between a higher molecular weight hydrocarbon carboxylic acid and an alkyl N-alkylene diamine.

6. An aqueous insecticidal composition comprising dispersed in water a solid insecticidal toxicant and a small amount of the salt of a dicarboxylic acid of less than 7 carbon atoms with a monoamide formed by reaction between a carboxylic acid of a higher molecular weight hydrocarbon and an alkylene polyamine, in which at least one of the amino groups of the polyamine is primary.

7. An aqueous insecticidal composition comprising dispersed in water a solid insecticidal toxicant and a small amount of the salt of an aliphatic dicarboxylic acid of less than 7 carbon atoms with a mono-amide formed by reaction of an aliphatic hydrocarbon carboxylic acid having from 10 to 30 carbon atoms and a hydroxy alkyl N-alkylene diamine.

8. An aqueous insecticidal composition comprising dispersed in water a solid insecticidal toxicant and a small amount of the malate of the reaction product of higher fatty acids with hydroxy ethyl N-ethylene diamine.

9. An aqueous insecticidal composition comprising dispersed in water a solid insecticidal toxicant and a small amount of the malate of the reaction product of a mixture of higher fatty acids having a terminal hydrocarbon chain of at least 8 carbon atoms with ethanol N-ethylene diamine.

10. An aqueous insecticidal composition comprising dispersed in water a solid insecticidal toxicant and a small amount of the malate of $$R—NH—C_2H_4—NH—C_2H_4—OH$$

wherein R represents a mixture of acyl radicals from palmitic and stearic acids.

11. A method for increasing the deposition of suspended insecticidal toxicants from an aqueous carrier, comprising adding thereto a small amount of the salt of a polycarboxylic acid of less than 7 carbon atoms with an acylated alkylene polyamine, in which the acyl radical has a terminal hydrocarbon chain of at least 8 carbon atoms.

12. A method for increasing the deposition of suspended insecticidal toxicants from an aqueous carrier, comprising adding thereto a small amount of the salt of a polycarboxylic acid of less than 7 carbon atoms with an acylated alkanol N-alkylene polyamine, in which the acyl radical has a terminal hydrocarbon chain of at least 8 carbon atoms.

13. A method for increasing the deposition of suspended insecticidal toxicants from an aqueous carrier, comprising adding thereto a small amount of the malate of $$R—NH—CH_2—CH_2—NH—CH_2—CH_2—OH$$

wherein R represents a mixture of acyl radicals from palmitic and stearic acids.

KENNETH E. MAXWELL.